United States Patent Office 3,209,046
Patented Sept. 28, 1965

3,209,046
ALKYLATION OF AROMATIC COMPOUNDS
Ernest Bryson McCall, Llangollen, and Ryland James Roberts, Glynceiriog, near Wrexham, Wales, assignors to Monsanto Chemicals Limited, London, England, a British company
No Drawing. Filed Nov. 6, 1961, Ser. No. 150,168
Claims priority, application Great Britain, Nov. 9, 1960, 38,428/60
9 Claims. (Cl. 260—671)

This invention relates to a new process by which an aromatic compound can be alkylated.

By alkylation of a compound is meant the introduction of an aliphatic radical, that is to say a radical joined by an aliphatic carbon atom to the compound into which it is introduced. An aliphatic radical can thus be a substituted or unsubstituted alkyl or cycloalkyl radical, for instance a methyl, trichloromethyl, benzyl or cyclohexyl radical. A specific example of an alkylation is for example the introduction of a trichloromethyl radical into diphenyl to produce a trichloromethyldiphenyl.

The introduction of an aliphatic radical into an aromatic compound does, in principle, constitute an important reaction, and the formation of a trichloromethyldiphenyl referred to above is of course only one example of the type of compound that can be produced. Trichloromethyl aromatic compounds are themselves valuable products, by virtue of the fact that they can be readily hydrolyzed to form carboxylic acids.

The alkylation reaction that has now been discovered provides a valuable new route to many aromatic compounds. Such compounds are obtained in a relatively high state of purity and in the absence of large quantities of undesirable, dark-colored by-products.

The process of the invention is one for the alkylation of an aromatic compound, in which said compound is heated with an alkylating agent that is an aliphatic substance containing, linked to an aliphatic carbon atom, a sulphonyl halide group, a sulphonic acid group, or a sulphonic acid group in the form of a salt that decomposes at the reaction temperature.

The aromatic compounds that can be alkylated are compounds that possess a cyclic system that is stabilized by the presence of non-localized $\pi$-electrons, for instance, benzene, diphenyl, naphthalene, benzofuran or thiophene.

Particularly excellent results are obtained in the process when the substance employed as the alkylating agent is an aliphatic sulphonyl chloride or bromide, or an aliphatic sulphonic acid.

The process is normally carried out at an elevated temperature, for example a temperature higher than 125° C., and preferably above 150° C. or 175° C. Good results are obtained using a reaction temperature in the range of 200° C. to 300° C., for instance between 220° C. or 240° C. and 275° C. In practice, the requirement as to reaction temperature means that the process is particularly convenient for the alkylation of aromatic compounds that are relatively high boiling, for example diphenyl. In the instance of more volatile reactants, however, a suitably high reaction temperature can be obtained by carrying out the process under an elevated pressure.

The aromatic compounds that can be alkylated include the carbocyclic aromatic hydrocarbons such as benzene and condensed benzenoid systems such as for instance naphthalene, and aromatic compounds having a heterocyclic ring such as for instance furan and thiophene. Nitrogen-containing compounds such as for instance pyridine and quinoline can be employed if desired, although owing to their basicity there is the likelihood of unwanted side reactions taking place; the process is therefore somewhat less useful in respect of such compounds. More than one type of ring can be present in the compound as in the case of compounds such as benzothiophene or dibenzothiophene. Where, for instance, a compound contains two rings, the alkylation can take place in either or both of them. In general the aromatic compound can contain a substituent, for example an aliphatic group, for instance an alkyl or cycloalkyl group, such as a methyl, ethyl, octyl, nonyl or cyclohexyl group, an aromatic group, for instance an aryl group, such as a phenyl or tolyl group; a halogen atom, for example chlorine or bromine; a carboxylic ester group; an alkoxy group, for instance a methoxy, ethoxy, butoxy or hexyloxy group; or an aryloxy group, for instance a phenoxy or tolyloxy group. Specific examples of aromatic compounds including substituted ones are: toluene, the xylenes, ethylbenzene, 2-methyl-2-phenyloctane, dodecylbenzene, diphenyl, o-, m- and p-terphenyl, quarterphenyl, 2-methyldiphenyl, 4-isopropyldiphenyl, 4,4'-di-isopropyldiphenyl, 1-methylnaphthalene, 1,6-dimethylnaphthalene, indene, anthracene, 3-ethylanthracene, chlorobenzene, bromobenzene, p-chlorotoluene, o-dichlorobenzene, 2-chloronaphthalene, 4-chlorodiphenyl, anisole, phenetole, diphenyl ether, 2-ethylthiophene, 2-phenylthiophene, thiophene-2-carboxylic ethyl ester, benzofuran, 4-methylbenzofuran, 5-bromobenzofuran, 6-methoxybenzofuran, 4-phenylbenzofuran, dibenzofuran, 1-cyclohexyldibenzofuran, 1-phenyldibenzofuran, 2,8-dichlorodibenzofuran, 2-ethoxybenzothiophene, 1-cyclohexyldibenzothiophene, 2-phenyldibenzothiophene, 4-bromodibenzothiophene and 2-phenoxydibenzothiophene.

In general, as has been stated, the aliphatic radical of the alkylating agent (that is to say the aliphatic radical that is introduced into the aromatic compound), is one linked through an aliphatic carbon atom to the sulphonyl halide group or one of the other specified groups. The aliphatic radical is normally a substituted or unsubstituted alkyl, or a substituted or unsubstituted cycloalkyl radical. Such an alkyl radical can, for instance, be a methyl, ethyl, propyl, butyl, amyl, hexyl, octyl, decyl or higher alkyl radical; a cycloalkyl radical can, for instance, be a cyclopentyl, cyclohexyl or methylcyclohexyl radical. Any substituents are preferably inert in the sense that they should not interfere with the reaction. Examples of suitable substituents include a halogen atom, especially a chlorine, bromine or fluorine atom; an aryl group, for instance a phenyl or tolyl group; an alkoxy group, for instance, a methoxy, ethoxy, butoxy or hexyloxy group; an aryloxy group, for instance a phenoxy or tolyloxy group, or a carboxylic ester group, for instance a carbethoxy group. The alkylating agent can contain one or more of the sulphonyl halide or other specified groups.

However, the alkylation process of the invention is particularly effective as a means of introducing into an aromatic compound an aliphatic radical which is unable to disproportionate when in the form of a free radical, that is to say for instance a methyl radical or a substituted methyl radical. When it is substituted, a methyl radical can carry one, two or three substituents, for example halogen atoms. Other radicals that are useful in this respect are per-substituted (that is fully substituted) alkyl or cycloalkyl radicals. In general a substituent can be one of those described above, although very often a substituent that is a halogen atom, for instance a chlorine, bromine or fluorine atom, or an aryl group, for instance a phenyl or tolyl group, is particularly useful. Examples of aliphatic radicals that can be introduced very effectively are methyl, chloromethyl, dichloromethyl, trichloromethyl, bromomethyl, fluoromethyl, trifluoromethyl, benzyl, tolylmethyl, methoxymethyl, dimethoxymethyl, phenoxymethyl, pentachloroethyl, pentafluoroethyl and perfluorohexyl radicals.

In general the alkylating agent consists of the required aliphatic radical, for instance, any of those described above, linked to the sulphonyl halide or other specified group. However, specific alkylating agents given by way of example are: methyl or ethyl sulphonyl chloride, methyl sulphonyl bromide, monochloromethyl sulphonyl chloride, monofluoromethyl sulphonyl chloride, trichloromethyl sulphonyl chloride, methyl sulphonic acid, ammonium methyl sulphonate, benzyl sulphonyl chloride, cyclohexyl sulphonyl bromide and pentafluoroethyl sulphonyl chloride. An example of an alkylating agent containing a sulphonic acid group in the form of a salt that decomposes in the process to a free sulphonic acid group is an ammonium salt of an aliphatic sulphonic acid.

The alkylation proceeds smoothly at the appropriate elevated temperature, and the presence of a catalyst is not essential. Neither is the presence of a solvent essential, although one can be employed if desired, particularly a high-boiling inert solvent such as for instance hexachlorobenzene or some other perhalogenated substance.

Good results are obtained when, relative to the quantity of the alkylating agent, the quantity of the aromatic compound in the process is large; the excess can, for example, be 5 to 25 times the molar equivalent, for instance about 10 to 20 times. However, a much smaller excess, for example 2 or 3 times the molar equivalent, or equimolecular proportions, can be employed. Moreover, particularly where it is desired to alkylate the compound in more than one position, it is sometimes appropriate to employ an excess of the alkylating agent.

The reaction time will depend on the reaction temperature and other factors, but a time of between 2 hours and 12 hours is often satisfactory, for instance a reaction time of about 3 to 6 hours. A longer reaction time may be advantageous sometimes, for example up to 20 or 30 hours or even longer.

The product of the process of the invention is often a mixture of isomers; appropriate alkylation of diphenyl for example gives a mixture of o-, m- and p-alkyldiphenyls. In many instances it is not essential that such isomers should be separated from each other, but simply that, for example, they should be isolated as a mixture from unchanged starting materials. If necessary, however, it is normally practical to separate a mixture of isomers.

The process of the invention is illustrated by the following examples:

*Example 1*

This example describes the production of n-hexyldiphenyls from diphenyl and n-hexyl sulphonyl chloride.

A mixture of 12.3 grams of n-hexyl sulphonyl chloride and 220 grams of diphenyl was boiled under reflux at a temperature of about 256° C. for 2 hours. Sulphur dioxide and hydrogen chloride were evolved together with other volatile products, 8 cc. of which were collected in a trap at 0° C.

At the end of the reaction period, excess diphenyl was distilled from the product, and distillation of a residue thus obtained gave 1.5 grams of mono-n-hexyl diphenyls (a mixture of isomers) as an oil having a boiling range of 132 to 138° C. at a pressure of 0.4 mm. of mercury.

*Example 2*

This example describes the production of trichloromethyldiphenyl, which was hydrolyzed and isolated as p-phenylbenzoic acid, from diphenyl and trichloromethyl sulphonyl chloride.

A mixture of 21.8 grams (0.1 mol.) of trichloromethyl sulphonyl chloride and 154 grams (1.0 mol.) of diphenyl was heated at 200° C. for 2 hours. Sulphur dioxide and hydrogen chloride were evolved and the volatile products also included about 1.5 cc. of carbon tetrachloride.

Excess diphenyl was distilled from the main reaction product, and the residue then consisted essentially of trichloromethyldiphenyl. This was boiled under reflux for 10 hours with a solution of 25 grams of potassium hydroxide in 25 cc. of water and 150 cc. of ethanol. At the end of this period ethanol and residual diphenyl were removed by steam distillation and the aqueous solution was extracted with ether. Acidification of the aqueous solution after ether extraction gave 2 grams of p-phenylbenzoic acid as a solid having a melting point of 220° C. Ether extraction of the acidified aqueous solution and evaporation of the solvent from the ether extracts gave a solid residue which was sublimed at 200° C. under a pressure of 25 mm. of mercury to give light yellow crystals of p-phenylbenzoic acid having a melting point of 210° to 219° C.

*Example 3*

This example describes the production of benzyldibenzothiophenes from dibenzothiophene and benzyl sulphonyl chloride.

A mixture of 19.1 grams (0.1 mol.) of benzyl sulphonyl chloride and 196 grams (1 mol.) of dibenzothiophene was heated at 260 to 280° C. for 4 hours.

The excess dibenzothiophene was distilled from the reaction mixture, leaving 24.6 grams of a residue which solidified on cooling, consisting essentially of isomeric monobenzyldibenzothiophenes.

While the invention has been described herein with regard to several specific embodiments, it is not so limited. It is to be nnderstood that modifications and variations of the invention, obvious to those skilled in the art, may be made without departing from the spirit and scope of said invention.

The embodiments of the invention in which an exclusive property or privilege is claimed are defined as follows:

1. A process for alkylating an aromatic compound which comprises heating, at a temperature of from about 125° C. to about 300° C., an aromatic compound selected from the group consisting of benzene, toluene, naphthalene, diphenyl, mono and dibenzofuran, and mono and dibenzothiophene, with a compound of the formula, $RSO_2Y$, wherein R is selected from the group consisting of alkyl, haloalkyl and benzyl, and Y is selected from the group consisting of OH and halogen.

2. A process as defined in claim 1 wherein the temperature is from about 200° C. to about 300° C.

3. A process as defined in claim 1 wherein the heating is carried out in the presence of an inert, perhalogenated, aromatic solvent.

4. An alkylation process which comprises heating, at a temperature of from about 125° C. to about 300° C., benzene with an alkyl sulfonyl halide.

5. An alkylation process which comprises heating, at a temperature of from about 125° C. to about 300° C. diphenyl with an alkyl sulfonyl halide.

6. An alkylation process which comprises heating, at a temperature of from about 125° C. to about 300° C., benzene with an alkyl sulfonic acid.

7. An alkylation process which comprises heating, at a temperature of from about 125° C. to about 300° C., diphenyl with an alkyl sulfonic acid.

8. An alkylation process which comprises heating, at a temperature of from about 125° C. to about 300° C., benzene with a haloalkyl sulfonyl halide.

9. An alkylation process which comprises heating, at a temperature of from about 125° C. to about 300° C., diphenyl with a haloalkyl sulfonyl halide.

References Cited by the Examiner

UNITED STATES PATENTS

| | | | |
|---|---|---|---|
| 2,606,213 | 8/52 | Ladd et al. | 260—329 |
| 2,882,301 | 4/59 | Sias et al. | 260—671 |
| 2,887,519 | 5/59 | Hervert | 260—671 |

WALTER A. MODANCE, *Primary Examiner.*

IRVING MARCUS, *Examiner.*